Feb. 18, 1958 W. KOBER 2,824,275
ELECTRIC GENERATOR AND REGULATOR
Original Filed March 21, 1951 5 Sheets-Sheet 1

INVENTOR.
William Kober
BY
Bean, Brooks, Buckley & Bean.
ATTORNEYS

Feb. 18, 1958     W. KOBER     2,824,275

ELECTRIC GENERATOR AND REGULATOR

Original Filed March 21, 1951     5 Sheets-Sheet 2

INVENTOR.
William Kober
BY
Bean, Brooks, Buckley & Bean
ATTORNEYS

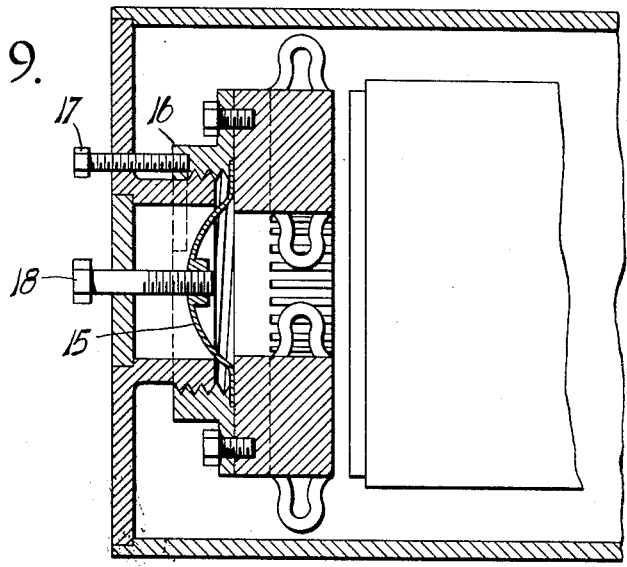
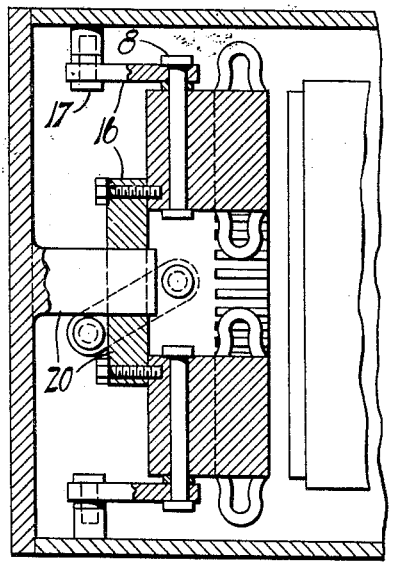
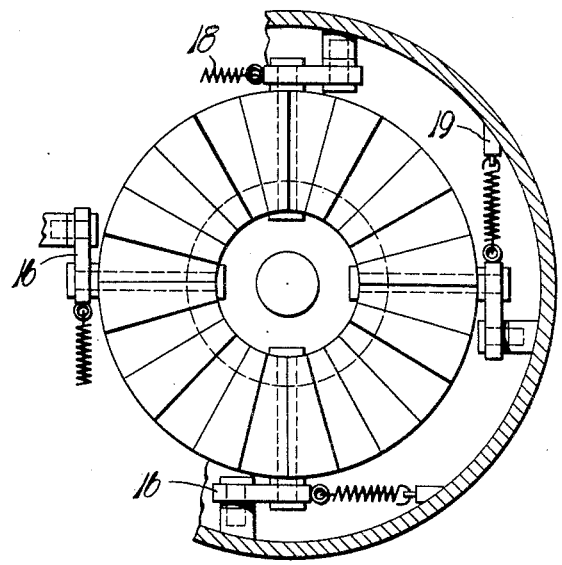

Feb. 18, 1958 W. KOBER 2,824,275
ELECTRIC GENERATOR AND REGULATOR
Original Filed March 21, 1951 5 Sheets-Sheet 4

INVENTOR.
William Kober
BY
Bean, Brooks, Buckley & Bean
ATTORNEYS

Feb. 18, 1958 W. KOBER 2,824,275
ELECTRIC GENERATOR AND REGULATOR
Original Filed March 21, 1951 5 Sheets-Sheet 5

INVENTOR.
William Kober
BY
Bean, Brooks, Buckley & Bean
ATTORNEYS

United States Patent Office 2,824,275
Patented Feb. 18, 1958

2,824,275
ELECTRIC GENERATOR AND REGULATOR

William Kober, Fairport, N. Y.

Continuation of application Serial No. 216,713, March 21, 1951. This application June 29, 1956, Serial No. 595,572

14 Claims. (Cl. 322—27)

This application is a continuation of application Serial No. 216,713, now abandoned, filed March 21, 1951.

In my copending applications, Serial Nos. 216,185, now Patent 2,719,931, granted October 4, 1955, and 217,799, now Patent 2,784,332, granted March 5, 1957, the general methods of constructing a permanent magnet alternator with an axial air gap, and the use of an adjustable axial air gap as a means for controlling the voltage of a permanent magnet or other type field has been described.

It is the object of this invention to provide means and structures whereby an axial air gap generator will adjust itself to maintain its terminal voltage substantially constant under varying loads.

It is another object to obtain said inherent adjustment to substantially constant terminal voltage over a range of speeds of rotation.

It is another object to obtain said inherent adjustment to substantially constant terminal voltage over a range of load power factors.

It is a principal object of the invention to provide means and structures so that an inherent adjustment to substantially constant terminal voltage will take place over a range of changes in load, and speed, and load power factor applied together or in any combination. The methods and structures that produce these and other objects of the invention are set forth in the following specifications and drawings.

In the drawings,

Fig. 9 is a sectional view of the generator showing a modified support for the armature.

Figs. 10 and 11 are respectively sectional and elevational views of still another modified support for permitting axial movement of the armature.

Figure 1:
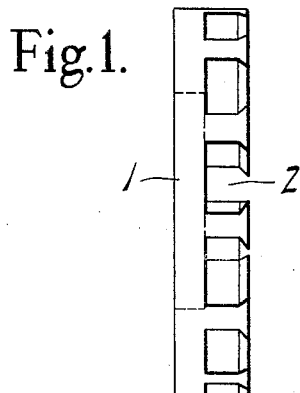
Figs. 1 to 5 show the armature and field of a dynamo electric generator of the type used in applying the invention.
Figure 2:
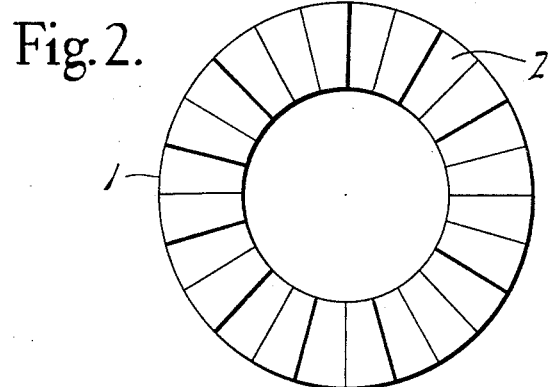
Figure 3:
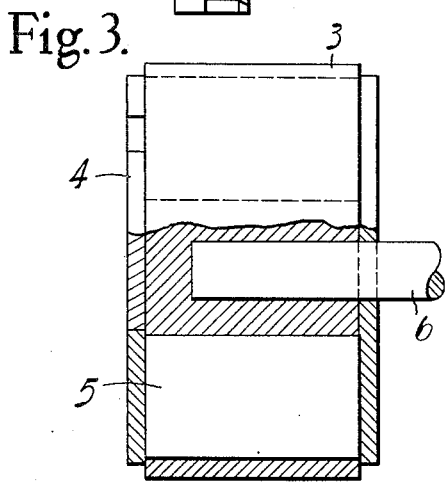
Figure 4:
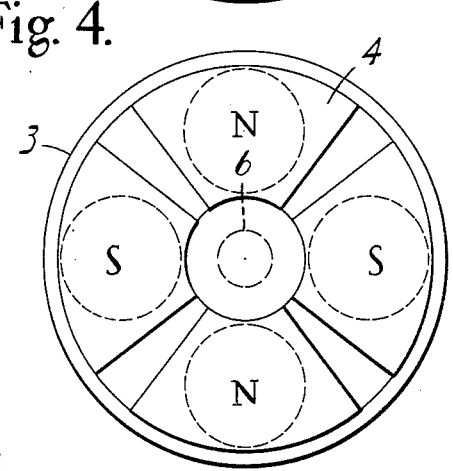
Figure 5:
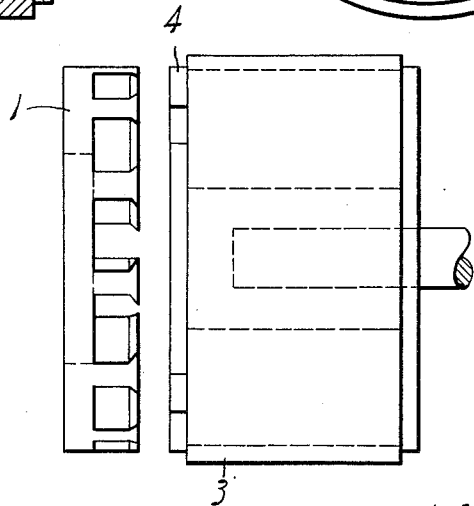

Figs. 1–5 show the general construction of the rotor 3 and stator 1 in a permanent magnet generator using an axial air gap. Four poles are shown, but the adaption to any number of poles is obvious. The slots 2 in stator 1 provide a place for the winding, not shown. The rotating field 3 contains magnets 5 and pole pieces 4 facing the stator. The rotor turns on shaft 6.

There are several forces acting between the rotor and the stator, and an understanding of them is necessary to an understanding of the invention.

First, there is the force of attraction between the pole face and the stator across the air gap. This force is given by the formula:

$$F = \frac{B^2 A}{8\pi}$$

where B is the flux density, and A the area involved. All quantities are in c. g. s. units. Since B is not always uniform at all points on the pole face, the term $B^2$ is more accurately the mean square of B over the variable flux density areas involved. To give an idea of the magnitudes involved, a 4 pole generator having a flux per pole of 600,000 lines, and weighing about 90 lbs., will have a force of attraction between rotor and stator of 1,500 lbs.

The second force to be considered is that developed as an additional attraction or repulsion by armature currents. When the armature current is exactly in phase with the generated voltage, the poles formed on the face of the stator are displaced exactly 90 electrical degrees from those of the rotor, and each section where repulsion (N against N or S against S) exists is balanced by an equal section where attraction exists (N against S). This is true of a polyphase winding in which armature reaction is constant in magnitude and moves smoothly in rotation exactly in step with the rotor field. When a polyphase system has an unbalanced load, or in a single phase generator, there are alternate attractions and repulsions, however, these average to zero over a full cycle, so that, except for a tendency to produce vibrations, no resultant force exists.

It should be noted here that for the load current to be in exact phase with the generated voltage requires a power factor slightly less than unity, and leading. A unity power factor load is in phase with the terminal voltage, but this lags the generated voltage because it contains as a component the inductive drop in the synchronous reactance of the generator, which always causes a lagging displacement. Thus, a unity power factor load produces in part the effects of departure in phase between generated voltage and load current to be discussed immediately following.

If the armature current lags the generated voltage by 90°, the poles formed on the armature directly oppose those of the field. This will produce a force of repulsion, which can more clearly be understood in terms of the resulting reduction in B, and the reduction in force that follows. It will be seen that this force depends greatly on a number of specific factors in the design of the generator.

If the armature current leads the generated voltage by 90°, the poles formed on the armature assist those of the field. A resulting force of attraction results.

The third force to be considered is a rotational force exerted on the stator by the rotor. Some amount of force exists even at no load, resulting from hysteresis and eddy current drag by the field on the stator, and from air friction across the small air gap. These forces are fairly small, however, and in addition relatively constant. A large rotational force results from the application of a power drain to the generator output. This is most conveniently viewed as being the back torque or power absorption by the stator which appears in electrical energy. If the winding and associated losses in the generator as well as the output load are taken into account, this view is quite accurate. Assuming an efficiency of 90 percent (10% internal losses), the output power P in kw. and the rotational torque T on the stator are given by the relation $$T = \frac{P}{n} \times \frac{33,000}{2\pi \times 0.746 \times 0.9} = \frac{P}{n} \times 7,823$$

where $n$ is the revolutions per minute. This equation is only approximate, since at low power factors the internal losses increase, and the efficiency drops, so that the torque is not entirely proportional to output power, but has some tendency to follow the current value.

In a generator built according to Figs. 1–5, the voltage generated in the armature winding can be varied over a large range by a small change in the air gap. An increase in the air gap decreases the voltage, and vice versa.

By the methods of the invention now to be described, the forces above analyzed can be used to produce motions of the armature which will affect the air gap in such a way as to oppose the change in voltage caused by the load. In this way, these changes can be kept small.

When the load increases, the output voltage drops, so that the desired motion is such as to reduce the air gap. However, the force of attraction between rotor and stator diminishes, and if the stator were to be mounted on springs, the motion would be in the opposite direction to that desired. The torque on the stator, however, is quite large, usually representing a greater force at the mean armature radius than the change in attraction above noted. According to the invention, the stator is so mounted that this torque produces a motion tending to close the air gap. This torque-produced motion is resisted by an elastic support, which is adjustable so that the degree of air gap, motion and hence voltage adjustment, is controlled to the desired value.

Figure 6:
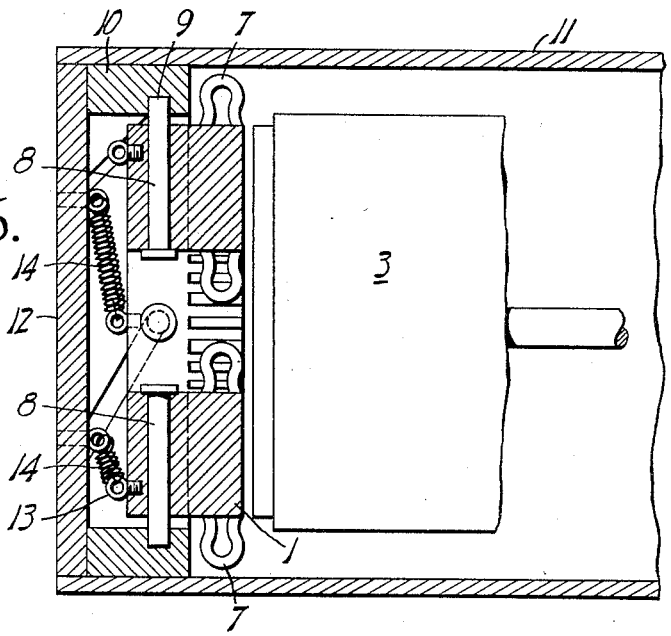
Fig. 6 is an axial sectional view of a generator showing the armature mounted for resiliently resisted limited rotation in response to change of torque.
Figure 7:
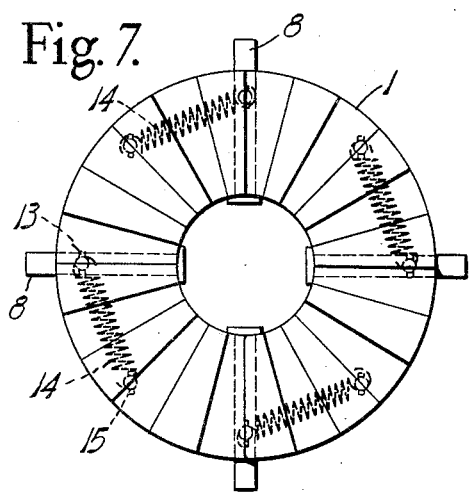
Fig. 7 is an elevation of the armature but with the windings omitted.
Figure 8:
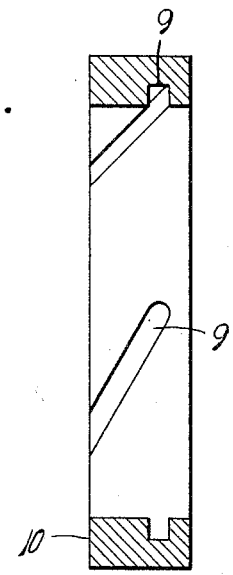
Fig. 8 is a sectional view of the grooved support for the armature.

Figs. 6, 7 and 8 show one way in which this result can be realized. In Fig. 7, four pins 8 are shown driven and anchored in the stator, and projecting beyond it a suitable distance. Although four pins are shown for purposes of illustration, any number from three up is obviously useful. These pins fit into four angled slots 9 in the stator support 10, which is in turn fastened to the housing 11. The slots 9 are better shown in Fig. 8. The slots are closed at the front end to stop the motion of the stator before it can come in actual contact with the rotor. They are open at the rear to permit easy assembly, but in working position the back plate 12 prevents the air gap from exceeding a predetermined maximum amount.

Springs 14 are fastened between pins 13 in the stator and 15 in the back plate, to restrain the rotary motion of the stator. The tension in these springs is adjustable by rotation of the back plate 12, which is mounted so that it can be rotated and locked in a number of positions. By adjustment of these springs, the stator is so controlled that its rotation is roughly proportional to the torque on the stator. As the stator rotates, the slots slide it toward the rotor, reducing the air gap by the desired amount.

The slope of slot 9 is of importance in securing the best results. Since the application of load reduces the magnetic pull of the rotor on the stator, producing through the inclined plane action of the screw 8, 10 a tendency to rotate in the incorrect direction, the torque must be given a definite mechanical advantage to overcome this. Since the change in magnetic pull is normally less than the torque force at the radius of the pins, any slope under 45° is practical. As the slope is reduced, the rotary motion of the stator increases.

It will be obvious that the direct engagement of pins 8 with the slots 9 may be replaced by a fully developed multiple thread, with the female part cut in 10 and the male part cut in a collar in turn mounted to stator 1. The male and female threads may also be interchanged between these parts. This construction is illustrated in Fig. 9. To limit the motion of the stator, pin 17 is fitted into slot 16, which is of the proper angular width to permit the desired motion. Flat or leaf spring 15, adjusted by screw 18 develops a direct backward pull. In this form, the spring force required depends on the pitch of the screw. Springs such as those shown in Figs. 6, 7 and 8 may also be used.

In Figs. 10–11 links 16 are used to give the relation between rotational and forward motion. Each link has a spring 18 mounted to the moving end of the link from an adjustable anchorage 19. When links are used, an axial bearing is sometimes advisable, as shown at 20, to prevent twisting and the resulting unbalance of the links.

Figure 12:
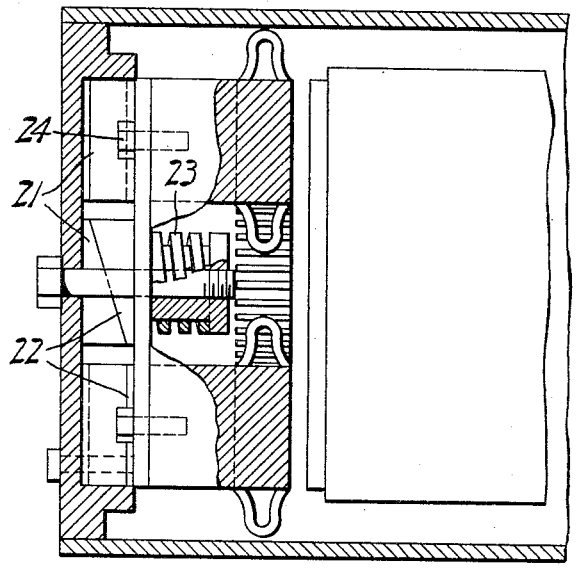
Fig. 12 shows still another modification of the armature support.

Another method of support is shown in Fig. 12, where inclined planes 21 fastened to the stator slide on matching planes 22 mounted on the rotor. Here, it is necessary to use a spring 23 strong enough to overcome the magnetic attraction between rotor and stator as well as to supply the added resistance which is overcome by the sliding on the inclined planes when the stator applies torque as the result of generator loading. In this form, the planes may be in direct sliding contact, or separated by balls or rollers. A pin 24 which fits in a slot in the part 22 limits the angular motion.

Figure 13:
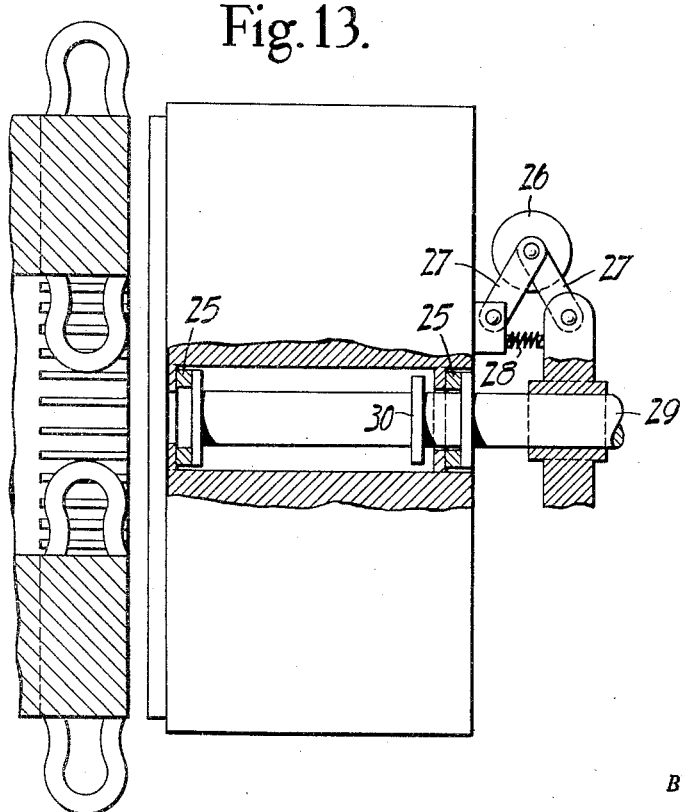
Fig. 13 is a sectional view showing the rotor field member mounting on the shaft for limited axial movement thereon.
Figure 14:
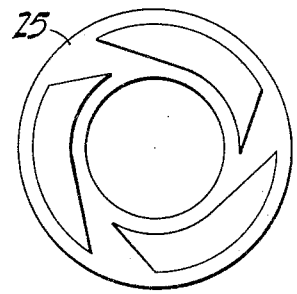
Fig. 14 shows one of the flexure plates used in this mounting.

In generators of the type to be used in the invention, the output voltage varies in proportion to the speed, all other factors remaining constant. In a permanent magnet field generator, the proportion is very nearly direct. The torque compensation above described for load variations is not useful in controlling speed effects. Such control is accomplished according to the invention as follows:

In Figs. 13–14, the field structure 3 is shown, mounted on shaft 29 by flexure plates 25 or similar devices permitting axial motion under spring resistance but maintaining a rigid alignment of the axis of 3 with that of the shaft. Fly ball 26 and links 27 or other similar devices not illustrated but known in the art provide a force proportional to speed, which is yielded to in proportion by flexure plates 25. An additional spring 28 may be provided if needed. As the speed increases, the weights 26 pull outward more strongly, pulling the rotor away from the stator. A stop 30 is provided if otherwise the spring action would permit contact between rotor and stator at low speeds. By controlling the angle of the links 27 and the mass of weight 26 it is possible to produce forces which greatly exceed the weight of the rotor, so that accelerations applied to the generator as a whole along the axis will not produce any serious voltage fluctuations.

Figure 15:
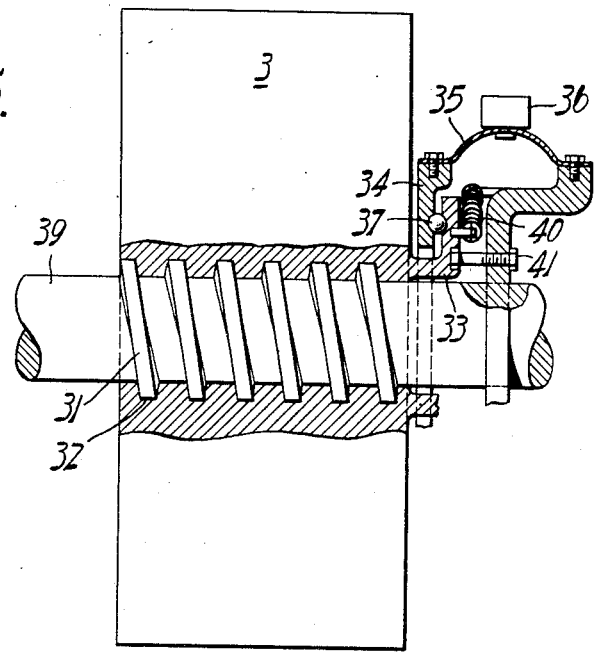
Fig. 15 is an elevation partly in section showing a modified mounting for the rotor field member.

It is evident that both the torque and speed compensating motions can be built into the rotor, and the stator fastened firmly in the ordinary manner. Alternatively, the stator may be provided with a manual adjustment of axial motion to set the initial value of voltage. This form is shown in Fig. 15, where 31, 32 shows the shaft 39 threaded into the rotor 3 using a screw thread of proper pitch, as already described in connection with Figs. 6 to 15. Springs 40 and stop screw 41, which limit the possible angular motion are also similar in function to springs 14 of Figs. 6 and 7 and screw 17 of Fig. 9. Part 33 is fastened to the rotor 3 and bears on ring 34 which is under control of the springs 35 and governor weight 36. Balls 37 are shown to minimize friction, but often a certain amount of friction is required here, to prevent oscillation of the rotor on load surges. It will usually also be advisable to cushion the ends of the slot in which the stop 41 fits, to prevent breakage by sudden changes of load. The form of Fig. 15, in which both load and speed adjustments take place in the rotor is simpler than those in which the stator makes the load adjustment and the rotor the speed adjustment. However, changes in speed of the driving means will produce inertial angular motions of the rotor with respect to the shaft, disturbing the voltage. This is not the case with the separated control function.

The combination of the screw 31, 32 and the centrifugal device 35, 36 will act to correct for load and speed changes simultaneously, when the power factor of the load remains constant.

When the power factor varies over a wide range, additional force producing devices are required to correct for the resulting voltage changes.

A generator having a substantially constant effective resistance R and synchronous reactance X may be treated as a perfect source coupled to its output through elements R and X in series. Generators not using field control, as those contemplated in this invention, normally have such substantially constant values of R and Z. In standard vector notation, $$\bar{E}-\bar{V}=\bar{I}(R+jX)=(I_R-jI_x)(R+jX)$$

where $I_R$ is the component of I in phase with V, and $I_x$ is the component of I 90 degrees out of phase with the lagging V.

Multiplying $$\bar{E}-\bar{V}=I_R R+I_x X+j(I_R X-I_x R)$$

The imaginary term (coefficient of $j$) acts mostly to rotate vector E in respect to vector V, and has little effect on its magnitude for normal values of $I_R$, $I_x$, R and X. Hence, these may be ignored in practice, whence $$E-V=I_R R+I_x X$$

This means that the drop in the generator $E-V$ (which is to be made up by voltage control) is the "in phase" current $I_R$ times the effective resistance R plus the "wattless" current $I_x$ times the reactance X. Hence, when the variable power factor loads are to be corrected for, which means differing values of $I_R$ and $I_x$, each term must be corrected for individually.

Power output is given by $VI_R$ and hence the torque is proportional to $I_R$, since V is substantially constant. Thus it is obvious that the torque devices above described will take care of this drop when properly adjusted.

To compensate for $I_x X$ an added torque must be developed which is proportional to $I_x$.

Figure 16:
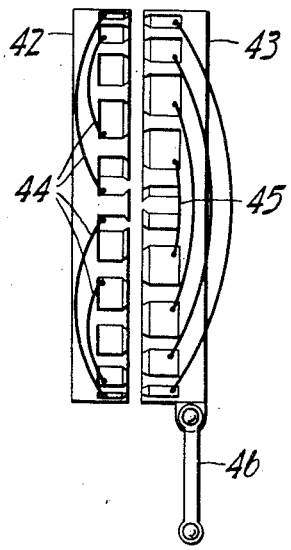
Fig. 16 shows dynamometer structure in which both movable and stationary members carry windings.

Such a force can be developed by, for example, constructing an electrodynamometer in which the field coil develops a flux 90° out of phase with V, and the current coil a current in phase with I, the load current. One form of such a device is shown in Fig. 16. Here part 42 is the field, and is stationary, while part 43 is movable, and is connected to the part it drives by link 46. Suitable devices not shown are provided to permit part 43 to move parallel to 42, and spaced only a short distance from it, but without permitting actual contact. The winding 44 of the field coil is highly inductive, and if voltage V is impressed across it, the resulting magnetic flux will be very close to 90° lagging in phase behind V. Winding 45 of the armature 43 carries the load current I, either directly or through an intermediate transformer. The force produced on 43 is then proportional to $VI_x$, and hence to $I_x$.

A similar result can be obtained, in the form of rotary motion, by using a standard "universal" series motor, reconnected as follows: The field terminals are brought out and connected to the voltage V. The field then replaces part 42 of Fig. 16. The brush terminals from the armature then carry current I, directly or through a transformer. The armature replaces part 43 of Fig. 16.

The pull developed by these dynamometers can be applied to the structure of Figs. 6, 7 and 8, for example by connecting link 46 of Fig. 16 to pin 13 on the stator. If desired, a multiplying leverage can intervene to secure the correct amount of force to eliminate the $I_x X$ drop.

Another quite different method of securing constant voltage with a large range of load power factors is to use a "compensator" (see U. S. Pat. No. 2,526,671, dated October 24, 1950, to William Kober). The compensator eliminates the effect of load power factor on the output voltage. The remaining effects of load and speed are then corrected by the structures of Figs. 1 to 15, and as a result, substantial constancy of terminal voltage under all possible operating conditions is maintained.

I claim:

1. In an electric generator having an armature, permanent magnet field producing means, one of said armature and said field producing means being mounted for rotation about a predetermined axis, said armature and said field producing means being separated in the direction of said axis of rotation to define an axial air gap therebetween, and means supporting one of said armature and said field producing means for movement relative to the other thereof along said axis automatically in response to variations in the torque force between said armature and said field producing means produced upon varying the electrical load on said generator, said supporting means causing such relative axial motion to vary the length of said air gap in a direction to maintain the output voltage of said generator substantially constant despite such changes in the electrical loading thereof.

2. In an electric generator of the axial air gap type having an armature, field producing means, said armature and said field producing means being separated to provide an air gap therebetween, means mounting at least one of said armature and said field producing means for movement relative to the other thereof in response to torque changes therebetween produced by variations in the electrical load on the generator in a manner to vary the length of said air gap in a direction to maintain the generator terminal voltage substantially constant as the electrical load is varied, and elastic means resisting such relative movement.

3. A dynamoelectric generator of the axial air gap type having an armature, rotating permanent magnet field producing means, an air gap separating the working faces of said armature and said field producing means, and means supporting one of said armature and said field producing means for movement toward and away from the other thereof to vary the length of said air gap automatically in response to variations in the rotational force exerted on said armature by said field producing means upon increasing and decreasing the electrical load on the generator, said supporting means being so arranged that the length of said air gap is varied in a direction maintaining the terminal voltage of said generator substantially constant with variations in the electrical load thereon.

4. The generator of claim 3, wherein said supporting means includes pin and slot means.

5. The generator of claim 3, wherein said supporting means includes inclined plane means.

6. The generator of claim 3, wherein said supporting means includes pivoted support link means.

7. In a dynamoelectric generator of the axial air gap type having an armature, field producing means, and an air gap separating said armature and said field producing means, means mounting one of said armature and said field producing means for rotation about an axis, and means supporting one of said armature and said field producing means for movement toward and away from the other thereof to vary the length of said air gap automatically in response to variations in the torque therebetween produced upon changing the electrical load on the generator, said supporting means causing such relative movement to vary the length of said air gap in a direction maintaining the generator terminal voltage substantially constant as the electrical load thereon is varied.

8. A dynamoelectric generator having an armature, permanent magnet field producing means mounted for rotation about an axis, said armature and said field producing means being separated in a direction along the axis of rotation of said field producing means to provide an axial air gap therebetween, and mounting means for said armature including means enabling rotation thereof about said axis automatically in response to variations in the rotational force exerted on said armature by said field producing means produced by changes in the electrical load on said generator, and means translating such rotation of said armature into movement thereof along said axis relative to said field producing means to vary the length of said air gap in a direction maintaining the generator terminal voltage substantially constant upon such changes in the electrical load thereon.

9. In an electric generator, an armature, permanent magnet field producing means, mounting means supporting said field producing means for rotation about an axis, and means supporting said armature for movement about said axis automatically in response to electrical load produced variations in the rotational force exerted thereon by said field producing means, such movement of said armature being in a direction to maintain the generator output voltage substantially constant as the electrical load thereon is varied.

10. In a generator, a stator, a rotor mounted for rotation about an axis, means supporting one of said stator and said rotor for rolling movement along and about said axis toward the other thereof automatically in response to changes in the rotational force therebetween produced by changes in the electrical loading of the generator, said supporting means causing such relative movement to vary the length of the air gap between said stator and said rotor in a direction to maintain the output voltage substantially constant, means biasing said one of said stator and said rotor toward the other thereof, and centrifugal force responsive means operable automatically in response to the centrifugal force produced by rotation of said rotor to move said one of said stator and said rotor away from the other thereof, thereby to vary the length of the air gap therebetween in a direction maintaining the generator terminal voltage substantially constant with variations in the speed of rotation of said rotor.

11. In an alternating current generator, an armature, rotating permanent magnet field producing means, said armature and said field producing means having working surfaces spaced apart along the axis of rotation of said field producing means to provide an axial air gap therebetween, and support means for said armature including means causing the same to move relative to said field producing means along said axis automatically in response to variations in the rotational force exerted on said armature by said field producing means produced by changes in the electrical loading of the generator to vary the length of said air gap in a direction maintaining substantially constant the terminal voltage developed by the generator.

12. A generator as set forth in claim 2, together with means for adjusting the tension of said elastic means.

13. A generator as set forth in claim 3, wherein said supporting means comprise inclined plane means having a slope of less than forty-five degrees.

14. A generator as set forth in claim 7, together with stop means limiting the extent of such relative movement.

References Cited in the file of this patent

UNITED STATES PATENTS

| 614,608 | Cantono | Nov. 22, 1898 |
| 1,070,437 | Ferguson | Aug. 19, 1913 |
| 1,131,551 | Price | Mar. 9, 1915 |
| 1,268,545 | Chapman | June 4, 1918 |
| 2,453,523 | McCullough | Nov. 9, 1948 |

FOREIGN PATENTS

| 25,245 | Great Britain | Oct. 8, 1898 |
| 172,387 | Great Britain | Dec. 2, 1921 |